Patent 2,995,532 — Corrosion Preventive Composition

2,995,532
CORROSION PREVENTIVE COMPOSITION
Troy L. Cantrell, Drexel Hill, Earl E. Fisher, Glenolden, and Mark L. Hill, Springfield, Pa., assignors to Gulf Oil Corporation, Pittsburgh, Pa., a corporation of Pennsylvania
No Drawing. Filed Nov. 20, 1958, Ser. No. 775,125
18 Claims. (Cl. 260—19)

This invention relates to a corrosion preventive composition and more particularly to a coating composition adapted to inhibit or prevent surface corrosion of metals.

In the handling, storage and use of metal articles, particularly metal articles containing iron as a major constituent, protecting the metal surfaces against corrosion is a problem of great concern. Protection of ferrous metals such as the surfaces of steel sheets, machinery, tools, engines, tanks, turbines, guns, boats and the like has given rise to various forms of protective coatings such as, for example, paints, platings, slushing oils, greases and the like. Protection of ferrous metal surfaces against rust formation in humid atmospheres such as those encountered in the tropics and on the seaboard as well as on board ships requires a coating composition which will form a water-impervious film on surfaces coated therewith.

Coating compositions of the more or less permanent type such as, for example, platings have been satisfactory in some instances but the platings are generally expensive and for some applications a coating which can not be removed is undesirable. On the other hand, coating compositions which are readily removed are frequently undesirable because the protection afforded by such compositions is of short duration, especially where the coating is exposed to natural weather conditions.

In accordance with the present invention, a coating composition is provided which gives prolonged protection against corrosion normally resulting when metals are exposed to the elements yet can be readily removed by the use of a common solvent. The coating composition of the present invention is readily applied to metal surfaces in the form of a thin protective film. A protective layer of relatively minute thickness and non-objectionable character is obtained as the result of the evaporation of a volatile solvent. Metal surfaces coated with a composition of the invention are economically and effectively protected over a relatively long period of time under widely divergent conditions of temperature, precipitation, immersion, sunlight and other atmospheric factors. The composition can be easily applied at all reasonable temperatures by a dipping, a spraying, or a brushing procedure.

We have found that an improved corrosion preventive composition which is adapted to form a water-impervious film on metal surfaces and which combines prolonged resistance to corrosion with ease of application to the metal surfaces to be protected can be obtained by compounding a micro-crystalline wax, a higher fatty alcohol, a metal salt of a fatty acid modified phenol-aldehyde resin, an aluminum pigment and an amine salt of a diester of o-phosphoric acid. The composition thus formed provides an excellent coating material adapted for dissolution in any suitable volatile solvent to form a liquid coating composition useful on metal surfaces. Evaporation of the solvent leaves the soluble constituents in a uniform film on the surfaces of the metal, the film having the improved properties hereinabove mentioned.

Protective films resulting from using a composition of the invention are relatively thin, the thickness of a single coating normally averaging less than about 0.003 inch. Heavier films can be obtained by employing a base material containing a very small amount of solvent. By varying the amount of solvent, the film thickness may vary from about 0.001 to 0.004 inch. The coatings afford surprising protection against outdoor and interior exposure as well as against salt spray, immersion, precipitation, and the like. The coatings have no deleterious corrosive effect upon the metal and may be sprayed, brushed, rolled, wiped, or applied by any conventional method.

The wax employed in the composition of the invention comprises a micro-crystalline wax having a melting point of about 140° to about 170° F. The wax can contain a small amount of oil provided the desirable characteristics of the wax are not lost. For example, we can employ a petrolatum containing up to about 25 percent by weight of oil unless the oil detracts from the tackiness modifying characteristics of the wax. In general, micro-crystalline waxes have a high melting point and are all of about the same molecular weight. The hydrocarbons of which the micro-crystalline waxes are composed are reported to have carbon chains twice the length of those of the micro-crystalline waxes. The micro-crystalline waxes, in general, have a high degree of plasticity which makes them particularly useful in the composition of the present invention. The micro-crystalline waxes are particularly suitable because of the smooth texture which these waxes impart to the composition. Typical examples of the micro-crystalline waxes are the petrolatum waxes. Petrolatum waxes are refined from petroleum stock and are available commercially. The micro-crystalline wax is employed in an amount sufficient to improve the water repellency of the coating composition and to reduce the tackiness of the binder which in the composition of the invention comprises the metal salt of a fatty acid modified phenol-aldehyde resin. In general, the micro-crystalline wax comprises about 2 to about 15 percent by weight of the total composition. A preferred embodiment of the invention utilizes about 5 to about 10 percent by weight of petrolatum wax.

The higher fatty alcohol and the metal salt of the fatty acid modified phenol-aldehyde resin can be employed as separate constituents or the alcohol can be formed during the preparation of the condensation product. For example, we may condense a phenol with an aldehyde and a higher fatty acid and then convert the condensation product to a metal salt. To the resulting metal salt, a higher fatty alcohol is then added yielding a mixture of the higher fatty alcohol and the metal salt of the condensation product. Alternatively, the higher fatty alcohol need not be added last, but may be mixed with the ingredients used to form the condensation product, i.e., the phenol, aldehyde and higher fatty acid. In other words, the higher fatty alcohol can be added during any stage of this method of preparation.

Instead of adding the alcohol as a separate constituent, the fatty acid modified phenol-aldehyde resin can be prepared utilizing an ester. It is known, for example, that the hydrolysis of esters with a metal base results in the formation of a metal salt of the liberated fatty acids and free fatty alcohols. Accordingly, a preferred method of obtaining the condensation product comprises saponifying an ester with a metal base and condensing the saponification product with the phenol and the aldehyde. This method avoids a separate neutralization step and the separate addition of free fatty alcohols, two of the ingredients being present originally in the form of an ester. In the cases where the metal salt to be prepared does not form a strong base, e.g., the heavy metals such as iron, copper, lead, etc., the saponification is conducted with an alkali metal base, and after the condensation product has been made, the alkali metal salt thereof is subjected to metathesis or double decomposition with a water soluble salt of such heavy metal, thereby obtaining the heavy metal salt of the condensation product.

Another method of preparing the condensation product in admixture with the higher fatty alcohol comprises forming the condensation product of the phenol, aldehyde and the ester and then saponifying the condensation product with a metal base, thereby liberating the higher fatty alcohol from the condensed ester and forming the metal salt of the condensation product. In this instance also, the metal salts of the condensation product other than the alkali metal salts may be formed by metathesis.

The higher fatty alcohol functions as a plasticizer for the metal salt of the condensation product and facilitates the formation of solutions in the solvent. Generally, in order to obtain the plasticizing and solubilizing functions of the free higher fatty alcohol, it is necessary to use it in an amount not less than ⅛ mol per mol of the fatty acid employed in preparing the condensation product. As much as 2 mols of the free higher fatty alcohol can be used per mol of fatty acid, but amounts in excess thereof are undesirable since such excess amounts tend to form masses which are too soft. Of course, when an ester is used in the preparation of the condensation product, the free fatty alcohol will be present in substantially equimolar amounts with the fatty acid.

The phenol used in preparing the phenol-aldehyde resin is advantageously a mono-alkyl phenol, the alkyl substituent containing 4 to 12 carbon atoms. The use of alkyl phenols having more or less carbon atoms in the alkyl group than the range stated is not satisfactory because the resulting salts of the condensation products prepared therefrom tend to be difficultly soluble in some solvents. A preferred group of the mono-alkyl phenols are those prepared by alkylating phenol with an olefin having from 4 to 12 carbon atoms in the presence of a concentrated sulfuric acid catalyst at a temperature not exceeding 220° F. The resulting alkylated phenols may be washed with water and dilute caustic soda to remove the sulfuric acid catalyst but this is not necessary. Monoalkyl phenols other than the secondary and tertiary monoalkyl phenols having from 4 to 12 carbon atoms may also be used. Thus, n-alkyl phenols having from 4 to 12 carbon atoms in the alkyl substituent, prepared by alkylating phenol with an n-alkyl halide in the presence of a Friedel-Crafts catalyst can also be employed. Representative mono-alkyl phenols include n-butyl phenol, sec-butyl phenol, tert-butyl phenol, n-amyl phenol, sec-amyl phenol, tert-amyl phenol, n-hexyl phenol, n-octyl phenol, isooctyl phenol, (alpha, alpha, gamma, gamma) tetramethylbutyl phenol, nonyl phenol, triisobutyl phenol and the like.

The aldehyde used in preparing the phenol-aldehyde resin is advantageously one containing from 1 to 4 carbon atoms. Thus, specific aldehydes include formaldehyde, acetaldehyde, propionaldehyde, n-butyraldehyde and isobutyraldehyde. Of these, formaldehyde is preferred. The remainder of the discussion insofar as the phenol-aldehyde condensation is concerned will be directed to a preferred embodiment wherein the aldehyde is formaldehyde.

The higher fatty acids employed in preparing the condensation products useful in the composition of the invention are the saturated and mono-olefinic aliphatic mono-carboxylic acids having at least 8 carbon atoms. These include caprylic, pelargonic, nonylenic, capric, decylenic, undecylic, undecylenic, lauric, myristic, palmitic, stearic, oleic, ricinoleic, arachidic, behenic, erucic, brassidic, carnauba, cerotic, melissic and psyllaic acids. Fatty acids of greater than mono-olefinic unsaturation, such as linoleic and linolenic acids, are undesirable since they tend to confer undesirable hardening and drying properties on the condensation products made therefrom. Fatty acids having less than 8 carbon atoms are not suitable since as the chain length decreases, the condensation products formed tend to become too hard and brittle and of decreasing solubility in petroleum solvents.

The higher fatty alcohols used in the composition of the invention are the saturated and monoolefinic aliphatic monohydric alcohols having at least 8 carbon atoms. These alcohols serve as a solubilizing and plasticizing agent. Examples of such alcohols include n-octyl, 2-ethylhexyl, octenyl, nonyl, decyl, decenyl, undecyl, undecenyl, lauryl, myristyl, cetyl, stearyl, oleyl, ricinoleyl, eicosyl, eicosenyl, docosyl, erucyl, ceryl and melissyl alcohols. Other fatty alcohols having less than 8 carbon atoms and polyolefinic fatty alcohols are not satisfactory since they may evaporate too readily, have too low a flash point for safe use, or give an undesirable odor to the product. The lower alcohols are not good plasticizers, and the polyolefinic alcohols give undesirable hardening and drying effects.

When an ester is used to prepare the acid-modified condensation product it will have the following structural formula

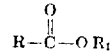

wherein R is an aliphatic radical of at least 7 carbon atoms and $R_1$ is an aliphatic radical of at least 8 carbon atoms. The ester thus illustrated is a combination of any of the foregoing alcohols and acids. Since many of such esters occur naturally, as in waxes, it is preferred to use such naturally occurring esters because of their relative cheapness. Examples of such materials are beeswax, carnauba wax, candelilla wax, Chinese insect wax, cottonseed wax, flax wax, ouricury wax, montan wax, sugar cane wax, sperm oil, spermaceti, sea weed wax, lanolin, and degras (wool fat). The use of degras is particularly preferred.

Any metal can be used in preparing the metal salt of the condensation products useful in the composition of the invention. For example, the metal used in preparing the binder can be selected from the group consisting of sodium, potassium, lithium, beryllium, calcium, magnesium, barium, strontium, zinc, silver, mercury, cadmium, aluminum, bismuth, tin, lead, copper, vanadium, antimony, chromium, manganese, iron, cobalt and nickel. When the composition is prepared by direct neutralization or the saponification of an ester, it is preferred to employ a strong base such as the alkali metal or alkaline earth metal hydroxides. When salts of metals other than alkali and alkaline earth metals are desired they are advantageously prepared by metathesis of the alkali metal salt with a water-soluble salt such as the nitrate, chloride or sulfate, as appropriate, of such other metal.

The amount of the metal salt of a fatty acid modified phenol-aldehyde resin employed in the composition of the invention depends upon the characteristics desired in the final composition. A satisfactory composition can be obtained when the metal salt and the higher fatty alcohol comprises about 10 to about 50 percent by weight of the total composition. A preferred embodiment, however, comprises about 20 to about 35 percent by weight of binder. The mol ratio of alcohol to fatty acid in the mixture is between about 0.125 to 1 and 2 to 1.

According to one embodiment a metal salt of a fatty acid modified phenol-formaldehyde resin can be prepared by condensing from 1 to 4 mols of a mono-alkyl monohydric phenol having from 4 to 12 carbon atoms in the alkyl group, an equimolar amount of formaldehyde and one mol of a higher fatty acid selected from the class consisting of the saturated and mono-olefinic aliphatic monocarboxylic acids having at least 8 carbon atoms, then forming a metal salt of the condensation product, and adding in an amount of from ⅛ to 2 mols per mol of said higher fatty acid a higher fatty alcohol selected from the class consisting of the saturated and monoolefinic aliphatic monohydric alcohols having at least 8 carbon atoms. The metal salt of the fatty acid modified phenol-formaldehyde resin can then be diluted with about an equal amount of a solvent to facilitate handling of this material. Thus, the metal salt of a fatty acid modified phenol-formaldehyde resin can be used either per se or in the form of a concentrate.

An example of a particularly suitable binder for use in the composition of the invention comprises the calcium salt of a degras fatty acid modified phenol-formaldehyde resin, the preparation of which is fully described in U.S. Patent No. 2,632,745 which issued on March 24, 1953, to Herschel G. Smith, Troy L. Cantrell and Mark L. Hill. As disclosed in said patent the calcium salt of a fatty acid modified phenol-formaldehyde resin can be readily prepared by saponifying one mol of degras with calcium hydroxide, the saponified mixture being reacted with 1 to 4 mols of a mono-alkyl monohydric phenol having from 4 to 12 carbon atoms in the alkyl group and an equimolar amount of formaldehyde to condense together the calcium salt of the degras fatty acids, the phenol and the formaldehyde.

A typical procedure employed in producing a concentrate of the calcium salt of a degras modified tetramethylbutyl phenol-formaldehyde resin in Stoddard solvent is illustrated by the following Example I.

EXAMPLE I

*(Calcium salt)*

One hundred and four (104) pounds of calcium hydroxide in a 33 percent by weight water slurry are added to a reaction vessel equipped with suitable means for heating, cooling and stirring. To the aqueous solution of calcium hydroxide is then added 710 pounds of para-(alpha, alpha, gamma, gamma) tetramethylbutyl phenol prepared by alkylating phenol with diisobutylene in the presence of a concentrated sulfuric acid catalyst. The phenol added is the crude reaction product, still containing the sulfuric acid catalyst. There is then added 710 pounds of melted high acid degras having a neutralization number of about 84 (ASTM D 974–48T). The mixture is then agitated and heated to 130° to 140° F. After thorough mixing, the reaction vessel is closed and made ready for the addition of formaldehyde. Thereafter, 268 pounds of a 37 percent by weight aqueous solution of formaldehyde is slowly added to the reaction vessel while maintaining the temperature at about 140° to 160° F. After the formaldehyde is added, the mixture is slowly heated to 280° F. This temperature is maintained for about two hours. The steam is then flashed off at 280° F. until the pressure in the kettle is reduced to atmospheric pressure. Vacuum is then applied to the vessel to dry the product thoroughly. The product is then cooled to 200° F., and the reaction vessel is purged with carbon dioxide to remove air. The product is then diluted with 1475 pounds of Stoddard solvent and further cooled to 150° F. The diluted product is then filtered to remove excess calcium hydroxide and any other insolubles. The undiluted reaction product is a fairly hard light brown mass having a melting point of about 238° F. It is permanently thermoplastic and readily soluble in petroleum naphtha.

Typical properties of the diluted reaction product obtained in accordance with the above procedure are as follows:

| | |
|---|---|
| Gravity, ° API | 25.8. |
| Viscosity, SUS at 100° F | 208. |
| Flash point, (P–M) ° F | 105. |
| Pour point, ° F | −35. |
| Physical state at room temperature | Liquid. |
| Appearance | Dark brown. |
| Water by distillation, percent | 0.2. |
| Ash, percent | 4.21. |

EXAMPLE II

*(Sodium salt)*

In preparing the sodium salt of a degras modified tetramethylbutyl phenol-formaldehyde resin, about 100 pounds of para-(alpha, alpha, gamma, gamma) tetramethylbutyl phenol are mixed with about 125 pounds of degras and heated to a temperature of about 160° F. While maintaining this temperature about 25 pounds of sodium hydroxide dissolved in about 65 pounds of water are slowly added with stirring. The mixture thus formed is held at this temperature until saponification of the degras is substantially complete. Thereafter about 40 pounds of a 37 percent by weight aqueous solution of formaldehyde is slowly added to the reaction mass while maintaining a temperature at about 140° to 160° F. The mixture is then refluxed until all of the formaldehyde is consumed. Thereafter the water is removed from the reaction mass by heating to a temperature of about 380° F. The hot reaction mass is then filtered to remove any excess sodium hydroxide and other insolubles. The solidified product is a thermoplastic mass having a melting point of about 310° F. and comprises the sodium salt of a degras modified tetramethylbutyl phenol-formaldehyde resin.

EXAMPLE III

*(Barium, iron, tin, aluminum and copper salts)*

The sodium salt prepared as above in Example II is subjected to a double decomposition reaction to prepare the salts of various other metals including barium, iron, tin, aluminum, copper, and the like. For example, the iron salt can be prepared by subjecting about 45 pounds of the sodium salt to a double decomposition reaction with about 32 pounds of ferrous chloride dissolved in water by agitating the reactants at a temperature of 150° to 170° F. The iron salt thus produced is washed with water to remove water-soluble salts and then dried at a temperature of 250° F. The barium, tin, aluminum and copper salts are prepared in a like manner by reacting in each instance about 45 pounds of the sodium salt with about 18 pounds of barium chloride dissolved in water for the barium salt, about 20 pounds stannous chloride dissolved in water for the tin salt, about 12 pounds of aluminum sulfate dissolved in water for the aluminum salt and about 7 pounds of cupric chloride dissolved in water for the copper salt. Each of the salts thus obtained are thermoplastic solids at room temperature.

The aluminum pigment which we incorporate in the composition of our invention can be either powdered aluminum or aluminum flakes, the latter being particularly advantageous. Aluminum pigments are available commercially in a number of grades of fineness in the form of powders and also as pastes in mineral spirits. One such commercially available material which is suitable for use in preparing a composition of the invention is "Albron," marketed by Aluminum Company of America, Pittsburgh, Pennsylvania. "Albron" is a pigment consisting of tiny aluminum flakes and is supplied in the form of a powder or as a paste. While we can employ the flake aluminum pigment as a powder in producing a composition of the invention, we advantageously employ the pigment in the form of a paste to facilitate producing a homogeneous composition. A flake aluminum pigment paste which we have found to be particularly satisfactory is "Albron Paste No. 205" which comprises about 35 percent by weight of mineral spirits and about 65 percent by weight of aluminum flakes 99.5 percent of which will pass through a 325 mesh screen. The amount of aluminum pigment employed in producing a composition of the invention can be varied from about 5 to about 40 percent by weight of the total composition. Particularly good results can be obtained, however, when the aluminum pigment comprises about 20 to about 30 percent by weight of the total composition.

The amine salt of the diester of o-phosphoric acid is conveniently prepared by neutralizing a diester of the particular phosphoric acid with approximately stoichiometric proportions of an amine of the class described herein. In most instances, it is advantageous that the pH of the reaction mixture be adjusted to substantially neutral, i.e., between about 5.5 and about 7.5, by controlling the amount of amine introduced into the reaction. In the case of amines that are very weak bases, however, a lower pH, for example of the order of 3.0 or 3.5 is satisfactory. The neutralization reaction normally takes place spontaneously, or substantially so, with the evolution of heat. It is preferable to maintain the reaction temperature below about 180° F., cooling the reaction mixture if necessary. In no case should the temperature of the reaction mixture be allowed to rise above about 200° F., if appreciable decomposition of the resulting salt is to be avoided. The preparation of typical salts, the use of which is included by this invention, is set forth in detail in U.S. Patent No. 2,387,537 to Smith and Cantrell.

Amines which form suitable amine salts for the purposes of this invention are those having the general formula:

where R, $R_1$ and $R_2$ are hydrogen or organic radicals. Thus, suitable salts for the purpose of this invention are formed by primary, secondary and tertiary amines whose organic substituents can be either aliphatic radicals, including saturated, unsaturated, cyclic, branched chain and straight chain radicals or aromatic radicals.

Thus, for example, the invention includes the use of oil-soluble organic phosphate salts of primary, secondary and tertiary, straight or branched chain alkyl, alkenyl, and alkadienyl amines, and primary, secondary and tertiary cycloalkyl amines, heterocyclic amines, and primary, secondary and tertiary aryl amines, including alkaryl and aralkyl amines. Representative examples of such amines are butyl, tributyl, octyl, dioctyl, dodecyl, octadecyl, octadecadienyl, cyclopentyl, cyclohexyl, dicyclohexyl, cycloheptyl, and abietyl (rosin) amines, aniline, n-methyl aniline, N,N-dimethyl aniline, toluidine, xylidine, pyridine, piperidine, and the like. Commercial mixtures of amines, such as cocoamine, form highly satisfactory phosphate salts of the kind included by the invention. Cocoamine is a mixture of amines prepared from coconut oil fatty acids, and contains a predominant amount of n-dodecyl amine (lauryl amine), together with minor amounts of n-octyl, n-decyl, n-tetradecyl, n-hexadecyl, n-octadecyl, and n-octadecenyl amines. Another suitable commercial amine mixture is "tallow" amine, a mixture of $C_{14-18}$ n-alkyl and alkenyl amines derived from animal tallow fatty acids. Although salts of amines containing hydrocarbon substituents are preferred, salts of amines whose substituents contain elements such as oxygen, halogens, sulfur, nitrogen or phosphorus which do not adversely affect the oil-solubility or polarity of the salt can be used. Examples of such substituted amines are morpholine and ricinoleyl amine.

Amines which form a preferred class of organic phosphate salts included by the invention are those containing at least one substituent having at least 6 and preferably 6 to 30 carbon atoms. Examples of such amines are n-hexyl, n-docosyl, n-hexacosyl, and n-triacontanyl amines, and aniline, toluidine, xylidine, and lutidine. Amines within the preferred class that form especially effective organic phosphate salts for the purposes of this invention are primary and secondary amines having an aliphatic hydrocarbon substituent that contains a chain of from 6 to 18 carbon atoms. Representative examples of such amines are cyclohexyl, n-hexyl, dicyclohexyl, n-octyl, n-dodecyl, n-octadecyl, and n-octadecenyl amines.

Organic phosphates that form suitable amine salts for the purposes of this invention are diesters of phosphoric acids whose two ester substituents are hydrocarbon radicals containing 3 to 12 carbon atoms. Examples of such organic diesters of phosphoric acids are the dipropyl, di-isoamyl, diisooctyl, didecyl, didodecyl, isoamyl isooctyl, diphenyl, ditolyl, dicyclohexyl, and dibenzyl esters of o-phosphoric acid. Although salts of organic phosphates whose organic substituents are hydrocarbon radicals are preferred, salts of other organic phosphates whose organic substituents contain elements such as oxygen, chlorine, bromine, iodine, fluorine, nitrogen, sulfur and phosphorus which do not adversely affect the oil-solubility or polarity of the ultimate amine salt can be used. Examples of such organic phosphates are the diethylol, dipropylol, dipolyoxyethyleneethylol, dipolyoxypropylenepropylol o-phosphates, and the diesters of dihydric and polyhydric alcohols such as ethylene glycol, sorbitol, mannitol, sorbitan, mannitan, pentaerythritol and o-phosphoric acid.

Within the preferred class of amine salts, the salts of organic phosphates whose two organic substituents are open-chain, saturated aliphatic hydrocarbon radicals containing from 3 to 12 carbon atoms are preferred. Such salts include, for example, amine salts of dipropyl, dibutyl, diisoamyl, di-n-octyl, diisooctyl, di-n-decyl, 3-methylbutyl, 2-ethylhexyl and didodecyl o-phosphates.

Specific examples of preferred salts included by the scope of this invention are the oil-soluble amine salts of n-octyl, n-dodecyl (lauryl), n-octadecyl (stearyl), n-octadecenyl (oleyl), n-octadecadienyl (linoleyl), and cyclohexyl and dicyclohexyl amines, and di-n-propyl, di-n-butyl, di-n-amyl, diisoamyl, isoamyl isooctyl (3-methylbutyl, 2-ethylhexyl), di-n-octyl, diisooctyl, di-n-decyl and didodecyl o-phosphates.

Of the dioctyl o-phosphates, those derived from the so called "oxo" octyl alcohols, which, as is known, are highly branched-chain saturated aliphatic monohydric octyl alcohols prepared by the "Oxo" process are particularly effective. The Oxo process, briefly, involves the hydroformylation of olefinic hydrocarbons, followed by hydrogenation of the carbonylic compounds thus obtained. Normally the olefinic hydrocarbons used in the manufacture of oxo-octyl alcohols are prepared by condensation of $C_3$ and $C_4$ olefins in the usual proportion in which they occur in petroleum refinery gases. In this case, oxo-octyl alcohols normally will contain a mixture of branched-chained isomers of octyl alcohol, and the mixture will consist mostly of isomeric dimethylhexanols. Although the above-indicated composition is the most common for oxo-octyl alcohols, it will be appreciated that the proportions of the mixed isomeric alcohols can be varied to some extent by varying the proportions of the $C_3$ and $C_4$ olefins used in preparing the $C_7$ olefin to be hydroformylated.

A specific example of a particularly effective agent for the purpose of the invention is the neutral addition salt ($pH_7$) of cocoamine and di oxo-octyl o-phosphoric acid. Other salts which can be used in accordance with the invention are the substantially neutral n-octyl amine, n-decyl amine, n-tetradecyl amine, n-hexadecyl and cyclohexyl amine salts of di oxo-octyl o-phosphoric acid.

Other examples of suitable salts are the oil-soluble salts of n-hexyl, n-docosyl, n-docosenyl, n-triacontanyl and benzyl amines, toluidine, xylidine, lutidine, pyridine, piperidine, N-methyl aniline and N, N-dimethyl aniline, and the diisoamyl and diisooctyl, dibenzyl, diphenyl and ditolyl esters of o-phosphoric acid.

The amine salt of the diester of o-phosphoric acid is preferably used in an amount between about 0.5 and about 1 percent by weight based on the weight of the total composition. If desired, however, the amount can be varied from about 0.1 to about 3 percent without adversely affecting the other beneficial properties of the composition.

The vehicle or solvent preferred in connection with the present corrosion preventive composition comprises any suitable solvent such as hexane, benzene, petroleum ether, or a light naphtha such as a petroleum distillate of 40° to 50° API gravity, not less than 50 percent boiling below about 340° F. and an end boiling point of not more than about 450° F. with a flash point not lower than about 100° F. One suitable solvent is Stoddard solvent. Sufficient solvent is used to produce a solution which can be applied to the article either by a dipping, a spraying, or a brushing procedure. The solvent does not remain on the surface but evaporates, leaving the dissolved material as a uniform film upon the surface of the metal. The amount of solvent employed will depend somewhat upon the thickness of the protective coating desired upon the metal and upon the method of application employed. In general, the solvent will not constitute more than about 50 percent by weight of the total composition; however, where extremely thin coatings are desired the solvent can comprise as much as 75 percent by weight, or more, of the total composition. When a thicker coating is desired, the amount of solvent is materially reduced. We have found that a good protective coating which can be easily applied consists of about 15 to about 50 percent by weight of solvent.

The individual constituents of the composition of this invention can be admixed in any order either per se or in the form of a concentrate so long as the amount of solvent in such concentrate does not adversely affect the properties of the final composition. For example, the metal salt of the fatty acid modified phenol-formaldehyde resin, the amine salt of the diester of o-phosphoric acid and the aluminum pigment can be added in the form of light mineral oil or naphtha concentrates in order to facilitate homogenization. Even the micro-crystalline wax may contain a small amount of oil so long as the desirable characteristics of the wax are not adversely affected. For example, the melting point of the wax should not be less than about 140° F.

The advantages obtained by using the improved corrosion preventive composition of the invention (Composition C) as compared with similar compositions containing less than all of the constituents in one instance (Composition A) and further compared with a similar composition containing a mica flake pigment instead of the flake aluminum pigment in another instance (Composition B) will be illustrated more particularly hereinbelow. The make-up of the compositions used in making the comparative tests are given in Table I as follows.

TABLE I

| Composition, percent by weight | A | B | C |
| --- | --- | --- | --- |
| Micro-crystalline wax | [1] 5.7 | [2] 5.1 | [2] 7.2 |
| Calcium salt of degras modified tetramethylbutyl phenol-formaldehyde resin (Example D) | 25.3 | 20.4 | 28.8 |
| Flake aluminum pigment (65% aluminum pigment, 99.5% will pass through 325 mesh screen; 35% mineral spirits—"Albron Paste No. 205") | | | 37.0 |
| Cocoammonium isoamyl isooctyl orthophosphate (84% concentrate in light mineral oil) | 0.5 | 0.7 | 1.0 |
| Mica flake pigment: | | | |
| TiO$_2$ | | 6.5 | |
| ZnO | | 23.0 | |
| Lamp black | | 0.13 | |
| Mica | | 16.5 | |
| Stoddard solvent (48° API gravity; 60% boiled below 340° F.; end boiling point of 394° F.; flash point, TCC:104° F.) | 68.5 | 27.67 | 26.0 |

[1] Deoiled wax having a melting point of 167.5° F. (ASTM D127-49).
[2] Wax contained about 13% by weight of oil (ASTM D721-47); melting point 158° F. (ASTM D127-49.)

In preparing the above comparative compositions the various constituents were blended at room temperature. Degras fatty alcohol, while not specifically listed, is present in admixture with the calcium salt of the degras modified tetramethylbutyl phenol-formaldehyde resin, the free fatty alcohol having been formed together with the fatty acid during the hydrolysis of the high acid degras with the aqueous solution of calcium hydroxide. The degras fatty alcohol and the degras fatty acid component are present in substantially equimolar proportions. Stoddard solvent was employed in each instance in order to obtain a composition sufficiently fluid to facilitate application of the coating composition to steel test specimens. The compositions were applied to the steel test specimens by immersing them in the coating composition, after which they were withdrawn and allowed to drain at 77° F. for about 24 hours until substantially all of the solvent had evaporated.

The coated test specimens were then subjected to conventional tests comprising the Federal Salt Spray Test No. 4001.1, and the Army-Navy Humidity Cabinet Test-JAN H 792. In the salt spray test the metal panels are placed in an enclosure where they are constantly sprayed with a salt mist comprising a 4 percent aqueous salt solution. The enclosure is maintained at a temperature of 95° F. In the Army-Navy Humidity Cabinet Test the metal panels are placed in a cabinet which is maintained at a temperature of 120° F., and a humidity of 100 percent. The 100 percent humidity is achieved by heating water in the bottom of the cabinet and simultaneously bubbling air through the water. The panels slowly revolve around the inner periphery of the cabinet.

Coating Composition B, containing the mica pigment, failed the salt spray test after seven days and the humidity cabinet test after twelve days. Coating Composition C, corresponding to a composition of the invention, did not fail either of the above tests even after 130 days. In order to further illustrate the improved properties of a composition of the invention under actual weather conditions Compositions A and C were applied to heavily rusted and pitted steel panels from which loose rust and scale had been removed by brushing with a stiff brush. The thus coated panels were then exposed to atmospheric conditions along the eastern seaboard of the United States at a location 80 feet from the normal high tide line. The panel coated with Composition C, a composition of the invention, was still in good condition even after forty-one months of exposure to the elements. The panel coated with Composition A, however, which contained no aluminum pigment was severely rusted after only 4 months of exposure. Composition C used in conducting the above tests had a specific gravity (60°/60° F.) of 1.07 and a furol viscosity at 100° F. of 109. This composition had a pour point of +20° F. and a flash point of 120° F.

In order to demonstrate the improved anti-rust properties of the compositions of this invention still further, additional samples were prepared and tested by the salt spray test described hereinabove. An extremely thin coating was utilized in order to accelerate the test. The results are indicated in Table II.

TABLE II

| Composition, percent by weight | D | E | F | G | H | I |
| --- | --- | --- | --- | --- | --- | --- |
| Micro-crystalline wax [1] | 7.2 | 7.2 | 7.2 | 7.2 | 7.2 | 7.2 |
| Calcium salt of degras modified tetramethylbutyl phenol-formaldehyde resin (Example D) | 28.8 | 28.8 | 28.8 | 28.8 | 28.8 | 28.8 |
| Aluminum flake | | 24.0 | | | 24.0 | |
| Aluminum powder | | | 24.0 | | | 24.0 |
| Cocoamine salt of isoamyl iso-octyl o-phosphoric acid (84% concentrate in light mineral oil) | 1.0 | 1.0 | 1.0 | | | |
| Cocoamine salt of di oxo-octyl o-phosphoric acid (84% concentrate in light mineral oil) | | | | 1.0 | 1.0 | 1.0 |
| Stoddard solvent (48° API gravity) | 63.0 | 39.0 | 39.0 | 63.0 | 39.0 | 39.0 |
| Inspection: Salt spray test, 95° F., 4% NaCl, hrs | 24 | 336 | 336 | 90 | 600 | 600 |

[1] Wax contained about 13% by weight of oil (ASTM D721-47); melting point 158° F. (ASTM D127-9.)

The data in the foregoing table clearly indicate the utility of the compositions of the invention, i.e., Compositions E, F, H and I. In addition, other compositions included within the invention may be substituted for the foregoing specifically described compositions. For example, the calcium salt of degras modified phenol-formaldehyde resin can be replaced with similar salts including the barium, iron, tin, aluminum, copper, sodium and strontium salts of other fatty acid modified phenol-formaldehyde resins wherein the fatty acid is selected from the class consisting of saturated and mono-olefinic aliphatic mono-carboxylic acids having at least eight carbon atoms, as disclosed hereinabove, in amounts of about 10 to about 50 percent by weight. Furthermore, the amine salt can be replaced by an oil-soluble substantially neutral salt of n-octyl, di-n-octyl, n-octadecyl and n-octadecenyl amine and diisoamyl or diisooctyl esters of o-phosphoric acid.

The above tests clearly show the improved results obtained with a composition of the invention containing aluminum flakes or aluminum powder as compared with compositions containing either no aluminum or a mica flake pigment. The results obtained with the composition containing the aluminum in combination with the other constituents were indeed surprising. The prolonged resistance to corrosion of the metal surfaces coated with a composition of the invention illustrates the unusual co-operative effect obtained by the combination of micro-crystalline wax, a higher fatty alcohol, a metal salt of a fatty acid modified phenol-formaldehyde resin, an aluminum pigment and a salt of a primary, aliphatic monoamine containing six to eighteen carbon atoms and a dialkyl ester of o-phosphoric acid whose alkyl substituents each contain three to twelve carbon atoms.

While we have described the preferred form of our invention as involving the use of a solvent, it will be clear from the foregoing that we also contemplate a composition prepared without the use of a solvent. Such a composition is desirable since the difficulties attending the shipment of liquids may be avoided. While we have described micro-crystalline wax as particularly useful in connection with our invention, any other wax which has its functional properties may be used. Also, while we have specifically shown the use of the calcium salt of the degras modified phenol-formaldehyde resin we can use other metal salts of degras modified phenol-formaldehyde resins which are thermoplastic. The aluminum pigment, as shown, can be either flake or powdered aluminum. The amine salt can likewise be varied within the class defined. Similarly our invention is not limited to the use of Stoddard solvent. Any relatively volatile solvent of the type listed herein, which is a common solvent for the materials of our composition, may be employed.

As disclosed hereinabove the solvent evaporates from the composition after it has been applied to the surface to be protected. It will be understood, therefore, that the weight per cent of the various ingredients are an indication of the relative proportions. Thus, the composition comprises the various constituents in the following relative proportions. About 2 to about 15 parts of micro-crystalline wax; about 10 to about 50 parts of a metal salt of a fatty acid modified phenol-aldehyde resin and a higher fatty alcohol wherein the mol ratio of alcohol to fatty acid is between about 0.125 to 1 and about 2 to 1; about 5 to about 40 parts of an aluminum pigment; and about 0.5 to about 3 parts of an amine salt of a diester of o-phosphoric acid. The solvent comprises up to about 75 parts.

This application is a continuation-in-part of our co-pending application Serial No. 518,415, filed June 27, 1955, now abandoned.

While our invention is described above with reference to the various specific examples and embodiments it will be understood that the invention is not limited to such examples and embodiments and may be variously practiced within the scope of the claims hereinafter made.

We claim:

1. An improved corrosion preventive composition adapted to form a water-impervious film on metal surfaces consisting essentially of about 2 to about 15 parts of a micro-crystalline wax having a melting point of about 140° to about 170° F.; about 10 to about 50 parts of a metal salt of a thermoplastic fatty acid modified phenol-aldehyde resin and a higher fatty alcohol wherein (a) the mol ratio of said alcohol to said fatty acid is between about 0.125 to 1 and about 2 to 1, (b) the fatty acid is selected from the class consisting of saturated and mono-olefinic aliphatic mono-carboxylic acids having at least 8 carbon atoms, (c) the aldehyde contains from 1 to 4 carbon atoms and (d) the fatty alcohol is selected from the class consisting of saturated and mono-olefinic aliphatic mono-hydric alcohols having at least 8 carbon atoms; about 5 to about 40 parts of an aluminum pigment; and about 0.1 to about 3 parts of a salt of a primary, aliphatic monoamine containing 6 to 18 carbon atoms and a dialkyl ester of o-phosphoric acid whose alkyl substituents each contain 3 to 12 carbon atoms.

2. The composition of claim 1, wherein the metal salt is an alkali metal salt.

3. The composition of claim 1, wherein the metal salt is an alkaline earth metal salt.

4. The composition of claim 1, wherein the metal salt is a calcium salt.

5. The composition of claim 1, wherein the fatty acid is degras fatty acids and the fatty alcohol is degras fatty alcohols.

6. An improved corrosion preventive composition adapted to form a water-impervious film on metal surfaces consisting essentially of about 2 to about 15 percent by weight of a micro-crystalline wax having a melting point of about 140° to about 170° F.; about 10 to about 50 percent by weight of a metal salt of a thermoplastic fatty acid modified phenol-formaldehyde resin and a higher fatty alcohol wherein (a) the mol ratio of said alcohol to said fatty acid is between about 0.125 to 1 and about 2 to 1, (b) the fatty acid is selected from the class consisting of saturated and mono-olefinic aliphatic mono-carboxylic acids having at least 8 carbon atoms and (c) the fatty alcohol is selected from the class consisting of saturated and mono-olefinic aliphatic monohydric alcohols having at least 8 carbon atoms; about 5 to about 40 percent by weight of an aluminum pigment; and about 0.1 to about 3 percent by weight of a salt of a primary, aliphatic monoamine containing 6 to 18 carbon atoms and a dialkyl ester of o-phosphoric acid whose alkyl substituents each contain 3 to 12 carbon atoms.

7. An improved corrosion preventive composition adapted to form a water-impervious film on metal surfaces consisting essentially of about 2 to about 15 percent by weight of a micro-crystalline wax having a melting point of about 140° to about 170° F.; about 10 to about 50 percent by weight of a calcium salt of a thermoplastic fatty acid modified phenol-formaldehyde resin and a higher fatty alcohol wherein (a) the mol ratio of said alcohol to said fatty acid is between about 0.125 to 1 and about 2 to 1, (b) the fatty acid is selected from the class consisting of saturated and mono-olefinic aliphatic mono-carboxylic acids having at least 8 carbon atoms and (c) the fatty alcohol is selected from the class consisting of saturated and mono-olefinic aliphatic monohydric alcohols having at least 8 carbon atoms; about 5 to about 40 percent by weight of an aluminum pigment; and about 0.1 to about 3 percent by weight of a salt of a primary, aliphatic monoamine containing 6 to 18 carbon atoms and a dialkyl ester of o-phosphoric acid whose alkyl substituents each contain 3 to 12 carbon atoms.

8. An improved corrosion preventive composition adapted to form a water-impervious film on metal surfaces consisting essentially of about 2 to about 15 percent by weight of a micro-crystalline wax having a melting point of about 140° to about 170° F.; about 10 to about 50 percent by weight of a calcium salt of a thermoplastic degras modified phenol-formaldehyde resin; about 5 to about 40 percent by weight of an aluminum pigment; and about 0.1 to about 3 percent by weight of a salt of a primary, aliphatic monoamine containing 6 to 18 carbon atoms and a dialkyl ester of o-phosphoric acid whose alkyl substituents each contain 3 to 12 carbon atoms.

9. An improved corrosion preventive composition adapted to form a water-impervious film on metal surfaces consisting essentially of about 2 to about 15 percent by weight of a micro-crystalline wax having a melting point of about 140° to about 170° F.; about 10 to about 50 percent by weight of a calcium salt of a thermoplastic degras modified tetramethylbutyl phenol-formaldehyde resin; about 5 to about 40 percent by weight of an aluminum pigment; and about 0.1 to about 3 percent by weight of a salt of a primary, aliphatic monoamine containing 6 to 18 carbon atoms and isoamyl isooctyl o-phosphoric acid.

10. An improved corrosion preventive composition adapted to form a water-impervious film on metal surfaces consisting essentially of about 2 to about 15 percent by weight of a micro-crystalline wax having a melting point of about 140° to about 170° F.; about 10 to about 50 percent by weight of a calcium salt of a thermoplastic degras modified tetramethylbutyl phenol-formaldehyde resin; about 5 to about 40 percent by weight of an aluminum pigment; and about 0.1 to about 3 percent by weight of a salt of a primary, aliphatic monoamine containing 6 to 18 carbon atoms and di octyl o-phosphoric acid.

11. An improved corrosion preventive composition adapted to form a water-impervious film on metal surfaces consisting essentially of about 2 to about 15 percent by weight of a micro-crystalline wax having a melting point of about 140° to about 170° F.; about 10 to about 50 percent by weight of a calcium salt of a thermoplastic degras modified tetramethylbutyl phenol-formaldehyde resin; about 5 to about 40 percent by weight of an aluminum pigment; about 0.1 to about 3 per cent by weight of the cocoamine salt of 3-methylbutyl, 2-ethylhexyl o-phosphoric acid; and the remainder consisting of a volatile solvent.

12. An improved corrosion preventive composition adapted to form a water-impervious film on metal surfaces consisting essentially of about 2 to about 15 percent by weight of a micro-crystalline wax having a melting point of about 140° to about 170° F.; about 10 to about 50 percent by weight of a calcium salt of a thermoplastic degras modified tetramethylbutyl phenol-formaldehyde resin; about 5 to about 40 percent by weight of an aluminum pigment; about 0.1 to about 3 percent by weight of the cocoamine salt of di oxo-octyl o-phosphoric acid; and the remainder consisting of a volatile solvent.

13. An improved corrosion preventive composition adapted to form a water-impervious film on metal surfaces consisting essentially of about 5 to about 10 percent by weight of petrolatum; about 20 to about 35 percent by weight of a calcium salt of a thermoplastic degras modified phenol-formaldehyde resin; about 20 to about 30 percent by weight of an aluminum pigment; about 0.5 to about 1 percent by weight of the cocoamine salt of 3-methylbutyl,2-ethylhexyl o-phosphoric acid; and about 15 to about 50 percent by weight of a volatile petroleum distillate.

14. An improved corrosion preventive composition adapted to form a water-impervious film on metal surfaces consisting essentially of about 5 to about 10 percent by weight of petrolatum; about 20 to about 35 percent by weight of a calcium salt of a thermoplastic degras modified phenol-formaldehyde resin; about 20 to about 30 percent by weight of an aluminum pigment; about 0.5 to about 1 percent by weight of the cocoamine salt of di oxo-octyl o-phosphoric acid; and about 15 to about 50 percent by weight of a volatile petroleum distillate.

15. An improved corrosion preventive composition adapted to form a water-impervious film on metal surfaces consisting essentially of about 2 to about 15 percent by weight of a micro-crystalline wax having a melting point of about 140° to about 170° F.; about 10 to about 50 percent by weight of a metal salt of a thermoplastic fatty acid modified phenol-formaldehyde resin, said metal salt of a thermoplastic fatty acid modified phenol-formaldehyde resin comprising a mixture of a higher fatty alcohol selected from the class consisting of the saturated and mono-olefinic aliphatic monohydric alcohols having at least 8 carbon atoms and a metal salt of a condensation product of from 1 to 4 mols of a monoalkyl monohydric phenol having from 4 to 12 carbon atoms in the alkyl group, an equimolar amount of formaldehyde, and 1 mol of a higher fatty acid selected from the class consisting of the saturated and mono-olefinic aliphatic mono-carboxylic acids having at least 8 carbon atoms, the amount of said higher fatty alcohol ranging from ⅛ to 2 mols per mol of said higher fatty acid; about 5 to about 40 percent by weight of an aluminum pigment; about 0.1 to about 3 percent by weight of a salt of a primary, aliphatic monoamine containing 6 to 18 carbon atoms and a dialkyl ester of o-phosphoric acid whose alkyl substituents each contain 3 to 12 carbon atoms; and the remainder consisting of a volatile solvent.

16. An improved corrosion preventive composition adapted to form a water-impervious film on metal surfaces consisting essentially of about 2 to about 15 percent by weight of a micro-crystalline wax having a melting point of about 140° to about 170° F.; about 10 to about 50 percent by weight of a calcium salt of a thermoplastic degras modified tetramethylbutyl phenol-formaldehyde resin, said calcium salt of a thermoplastic degras modified tetramethylbutyl phenol-formaldehyde resin comprising a mixture of degras fatty alcohols and a calcium salt of a condensation product of from 1 to 4 mols of para(alpha, alpha, gamma, gamma)tetramethylbutyl phenol, an equimolar amount of formaldehyde and 1 mol of degras fatty acids, the amount of said degras fatty alcohols ranging from ⅛ to 2 mols per mol of said degras fatty acids; about 5 to about 40 percent by weight of an aluminum pigment; about 0.1 to about 3 percent by weight of the cocoamine salt of 3-methyl-butyl,2-ethylhexyl o-phosphoric acid; and the remainder consisting of a volatile solvent.

17. An improved corrosion preventive composition adapted to form a water-impervious film on metal surfaces consisting essentially of about 2 to about 15 percent by weight of a micro-crystalline wax having a melting point of about 140° to about 170° F.; about 10 to about 50 percent by weight of a calcium salt of a thermoplastic degras modified tetramethylbutyl phenol-formaldehyde resin, said calcium salt of a thermoplastic degras modified tetramethylbutyl phenol-formaldehyde resin comprising a mixture of degras fatty alcohols and a calcium salt of a condensation product of from 1 to 4 mols of para(alpha, alpha, gamma, gamma)tetramethylbutyl phenol, an equimolar amount of formaldehyde and 1 mol of degras fatty acids, the amount of said degras fatty alcohols ranging from ⅛ to 2 mols per mol of said degras fatty acids; about 5 to about 40 percent by weight of an aluminum pigment; about 0.1 to about 3 percent by weight of the cocoamine salt of di oxo-octyl o-phosphoric acid; and the remainder consisting of a volatile solvent.

18. An improved corrosion preventive composition adapted to form a water-impervious film on metal surfaces consisting essentially of about 2 to about 15 parts of a micro-crystalline wax having a melting point of about 140° to about 170° F.; about 10 to about 50 parts of a metal salt of a thermoplastic fatty acid modified phenol-aldehyde resin and a higher fatty alcohol wherein (a) the mol ratio of said alcohol to said fatty acid is between about 0.125 to 1 and about 2 to 1, (b) the fatty acid is selected from the class consisting of saturated and mono-olefinic aliphatic mono-carboxylic acids having at least 8 carbon atoms, (c) the aldehyde contains from 1 to 4 carbon atoms and (d) the fatty alcohol is selected from the class consisting of saturated and mono-olefinic aliphatic monohydric alcohols having at least 8 carbon atoms; and about 5 to about 40 parts of an aluminum pigment.

References Cited in the file of this patent

UNITED STATES PATENTS

| | | |
|---|---|---|
| 2,632,745 | Smith et al. | Mar. 24, 1953 |
| 2,641,551 | Smith et al | June 9, 1953 |

UNITED STATES PATENT OFFICE
CERTIFICATE OF CORRECTION

Patent No. 2,995,532                          August 8, 1961

Troy L. Cantrell et al.

It is hereby certified that error appears in the above numbered patent requiring correction and that the said Letters Patent should read as corrected below.

Column 2, line 22, for "micro-crystalline", first occurrence, read -- macro-crystalline --.

Signed and sealed this 19th day of December 1961.

(SEAL)
Attest:

ERNEST W. SWIDER                          DAVID L. LADD
Attesting Officer                            Commissioner of Patents

USCOMM-DC